United States Patent

Higuchi

[11] Patent Number: 6,091,221
[45] Date of Patent: *Jul. 18, 2000

[54] MOTOR DRIVING APPARATUS FOR PERFOMING HIGH-SPEED ROTATION BY PHASE DETECTION CONTROL

[75] Inventor: Haruhiko Higuchi, Saitama-ken, Japan

[73] Assignee: Citizen Watch Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/693,191

[22] PCT Filed: Dec. 5, 1995

[86] PCT No.: PCT/JP95/02473

§ 371 Date: Aug. 6, 1996

§ 102(e) Date: Aug. 6, 1996

[87] PCT Pub. No.: WO96/18237

PCT Pub. Date: Jun. 13, 1996

[30] Foreign Application Priority Data

Dec. 8, 1994 [JP] Japan ................ 6-304440

[51] Int. Cl.[7] .................................... G05B 19/40
[52] U.S. Cl. ............................... 318/685; 318/254

[58] Field of Search ................ 318/685, 696, 318/254, 439, 138

[56] References Cited

U.S. PATENT DOCUMENTS

| | | | |
|---|---|---|---|
| 3,716,771 | 2/1973 | Maynard | 388/821 |
| 3,781,620 | 12/1973 | Toth | 388/819 |
| 5,451,832 | 9/1995 | Cameron et al. | 318/375 |
| 5,483,156 | 1/1996 | Nishihara | 324/173 |
| 5,608,320 | 3/1997 | Dinsmore et al. | 324/253 |

*Primary Examiner*—Jonathan Wysocki
*Attorney, Agent, or Firm*—Townsend and Townsend and Crew

[57] ABSTRACT

A motor driving apparatus including a stepping motor constituted by a stator having at least two poles. The driving apparatus includes a circuit for biasing one terminal of a driving coil of a motor to an intermediate potential of a power supply voltage. A counterelectromotive voltage detection circuit for detecting a counterelectromotive voltage generated upon rotation of a rotor is arranged at the other terminal. A pulse signal to rotate the rotor is output on the basis of a detection signal output from the counterelectromotive voltage detection circuit.

7 Claims, 15 Drawing Sheets

STATICALLY STABLE POINT   110   102a

ELECTROMAGNETICALLY STABLE POINT   111   102a

MOTOR DRIVING APPARATUS FOR PERFOMING HIGH-SPEED ROTATION BY PHASE DETECTION CONTROL

BACKGROUND OF THE INVENTION

1. Field of the Invention

The present invention relates to a motor driving apparatus for performing high-speed rotation by phase detection control.

2. Description of the Prior Art

To rotate a motor at a higher speed is one of the most important factors in terms of an improvement in basic performance of the motor, and has been studied and developed for many years. For example, electrical timepieces, which are one kind of products using motors, have recently been provided with multi-functions, and timepieces having various functions such as stop watch functions, alarm functions, and dual-time functions in addition to normal time display functions have been developed and put into practice. In each of these multi-functional timepieces, when the system is initialized in an initial state, e.g. in loading a battery therein, or when the mode is shifted, or the positions of hands are returned to 0 in normal use, the hands must always be fast-forwarded.

A conventional motor driving apparatus will be described below by exemplifying a stepping motor of an electronic timepiece. FIG. 8 is a view showing the arrangement of a motor driving apparatus constituted by a conventional bipolar stepping motor. FIGS. 9 to 14 are plan views each showing the positional relationship between the magnetic poles of a stator and a rotor. As shown in FIG. 8, the bipolar stepping motor serving as a means for converting an electrical signal into a mechanical rotation motion comprises a driving coil 101, a flat stator 102, and a rotor 103. The flat stator 102 has a step 102a. Motor drivers 104a and 104b are arranged to change the potential across the driving coil 101 and flow a current through the driving coil 101, thereby exciting the flat stator 102. In the case of the bipolar motor shown in FIG. 8, when no current flows through the driving coil 101, the pole position of the rotor 103 with respect to the flat stator 102 is a statically stable point 110 shown in FIG. 9. When a current flows through the driving coil 101 to excite the flat stator 102, the pole position of the rotor 103 with respect to the flat stator 102 is an electromagnetically stable point 111 shown in FIG. 10.

Normally in the electronic timepiece, a pulse signal for changing the potential across the driving coil 101 is output from the motor driver 104a or 104b for 4 to 5 mS to flow a pulse current through the driving coil 101, thereby rotating the rotor 103. The rotor 103 rotates during supply of the current to the driving coil 101. When the magnetic pole of the rotor 103 reaches a position shown in FIG. 11 with respect to the flat stator 102, the current flow through the driving coil 101 is stopped, but the rotor 103 inertially rotates to a position in FIG. 12. Then, the rotor 103 damped-oscillates about the statically stable point 110 and finally stops.

When a pulse signal is output from the motor driver 104a after the rotor 103 becomes stationary, to flow a current through the driving coil 101, thereby exciting the flat stator 102 as shown in FIG. 13, the rotor 103 rotates through 180° in a rotational direction A in FIG. 13. When a pulse signal is output from the motor driver 104b opposite to the motor driver which has previously output the pulse signal after the rotor 103 becomes stationary, the rotor 103 further rotates through 180° in the direction A in FIG. 13. The rotor 103 certainly rotates in the direction A in FIG. 13 by flowing a current through the driving coil 101 after the rotor 103 becomes stationary.

When the stepping motor is to be rotated at a high speed, the rotor 103 must be rotated at a high speed, as a matter of course. At this time, an output interval between pulses output from the motor drivers 104a and 104b must be shortened.

If the output interval between pulse signals is shortened so as to rotate the rotor 103 at a higher speed, a next pulse signal must be output even though the damped oscillation of the rotor 103 immediately after rotation has not stopped yet.

If the next pulse signal is output in a state in which the damped-oscillating rotor 103 reaches a position shown in FIG. 14, i.e. the rotor 103 exceeds the electromagnetically stable point 111, the rotor 103 rotates in a direction opposite to the direction A in FIG. 13, i.e. in a direction opposite to a normal direction. Therefore, to stably rotate the rotor 103, the output interval of pulse signals must be set to at least a time required to stabilize the damped oscillation of the rotor 103 upon rotation within a range where the rotor 103 does not exceed the electromagnetically stable point 111.

The total time of the pulse width of a pulse signal and the stabilization time for damped oscillation, i.e. the output period of the pulse signal, is at least about 10 mS. This indicates that the output frequency of the pulse signal is limited to about 100 Hz by the current driving scheme.

The above-described problem, however, has been improved by the scheme disclosed in Japanese Unexamined Patent Publication No. 6-23577 filed by the present applicant. FIG. 15 is a view showing the arrangement of an improved motor driving apparatus according to a prior art, in which a detection coil 105 and a counterelectromotive voltage detection circuit 106 are added to the above-described stepping motor in FIG. 8. The detection coil 105 is wound coaxially with the driving coil 101. The counter-electromotive voltage detection circuit 106 is constituted by a differential amplifier for detecting a counterelectromotive voltage generated in the detection coil 105 upon rotation of the rotor 103. In this prior art, the pole position of the rotating rotor 103 with respect to the flat stator 102 is obtained by detecting a counterelectromotive voltage generated upon rotation of the rotor 103 by the counter-electromotive voltage detection circuit 106 through the detection coil 105, and the output timing of the pulse signal is controlled on the basis of an output from the counterelectromotive voltage detection circuit 106.

In the above-described scheme disclosed in Japanese Patent Laid-Open No. 6-235777, when the pole position of the rotor 103 with respect to the flat stator 102 is to be detected, the detection coil 105 is used as a detection means for detecting a counterelectromotive voltage generated upon rotation of the rotor 103. The conventional stepping motor has only two contact points between the driving coil 105 and an electronic circuit, but the use of the detection coil 105 requires two more contact points between the detection coil 105 and the electronic circuit, i.e. a total of four contact points. The increase in the number of contact points between the coils and the electronic circuit greatly limits the range of structural design such as size and wiring. The use of the detection coil 105 itself increases the coil size, the manufacturing cost, and the like.

As a scheme for detecting a counterelectromotive voltage generated from the rotor 103 without using a detection coil and the like, a scheme disclosed in Japanese Examined Patent Publication No. 61-23516 has been proposed. In this scheme, when a counterelectromotive voltage generated from the rotor 103 is to be detected, one terminal of the driving coil 101 is connected to a power supply potential, and an output from a motor driver at the other terminal is set in a high-impedance state, thereby detecting the voltage level generated in the driving coil. However, since one terminal of the driving coil is connected to the power supply potential in this method, only a signal on the other side with respect to the fixed power supply potential can be detected, and the scheme cannot cope with an AC signal of a counterelectromotive voltage generated from the rotor. Therefore, a timing at which the counterelectromotive voltage goes to 0 level cannot be detected.

SUMMARY OF THE INVENTION

In accordance with the present invention, a motor driving apparatus includes: a stepping motor constituted by a stator having at least two poles, a rotor with a permanent magnet having at least two poles, and a driving coil magnetically coupled to the stator driving pulse generation means for outputting a pulse signal to drive the stepping motor; a driving circuit for supplying a driving current to the driving coil on the basis of the signal from the driving pulse generation means; a counter-electromotive voltage detection circuit for detecting a counterelectromotive voltage generated upon rotation of the rotor; and pole position detection means for detecting a pole position of the rotating rotor with respect to the stator on the basis of the counterelectromotive voltage generated in the counterelectromotive voltage detection circuit, the driving pulse generation means controlling an output timing of the pulse signal on the basis of a detection signal from the pole position detection means. The counterelectromotive voltage detection circuit is connected to one terminal of the driving coil. The motor driving apparatus further includes; bias means for biasing a potential level to a potential within the range of the power supply voltage, the bias means being connected to the other terminal of the driving coil.

The bias means is characterized to output a bias voltage which is about ½ the power supply voltage.

The motor driving apparatus is characterized by comprising switch means for controlling an operation of the bias means, the switching means being controlled to be in an OFF state during supply of the pulse signal from the driving circuit.

The motor driving apparatus is characterized by comprising delay means for delaying the pulse signal to drive the stepping motor on the basis of the detection signal from the pole position detection means.

The delay means is characterized to be a hysteresis comparator connected to an output side of the counterelectromotive voltage detection circuit.

The counterelectromotive voltage detection circuit is characterized to have DC voltage component removing means for removing a DC voltage component of the counterelectromotive voltage generated upon rotation of the rotor.

DETAILED DESCRIPTION OF THE PREFERRED EXEMPLARY EMBODIMENTS

Figure 1:
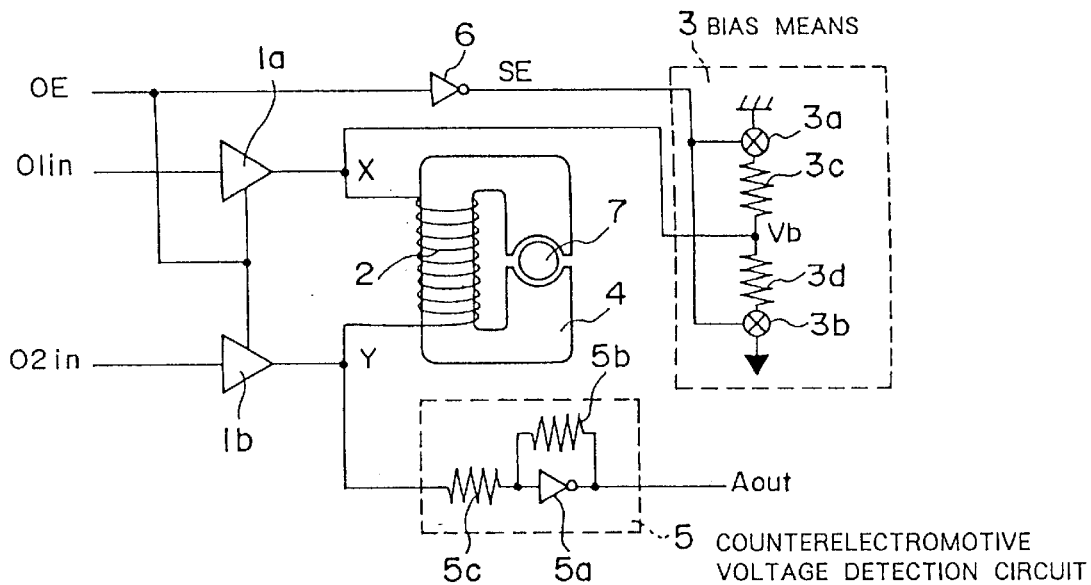
FIG. 1 is a circuit diagram showing a driving circuit in a motor driving apparatus according to the first embodiment of the present invention.

FIG. 1 is a circuit diagram showing a driving circuit in a motor driving apparatus according to the first embodiment of the present invention.

Figure 2:
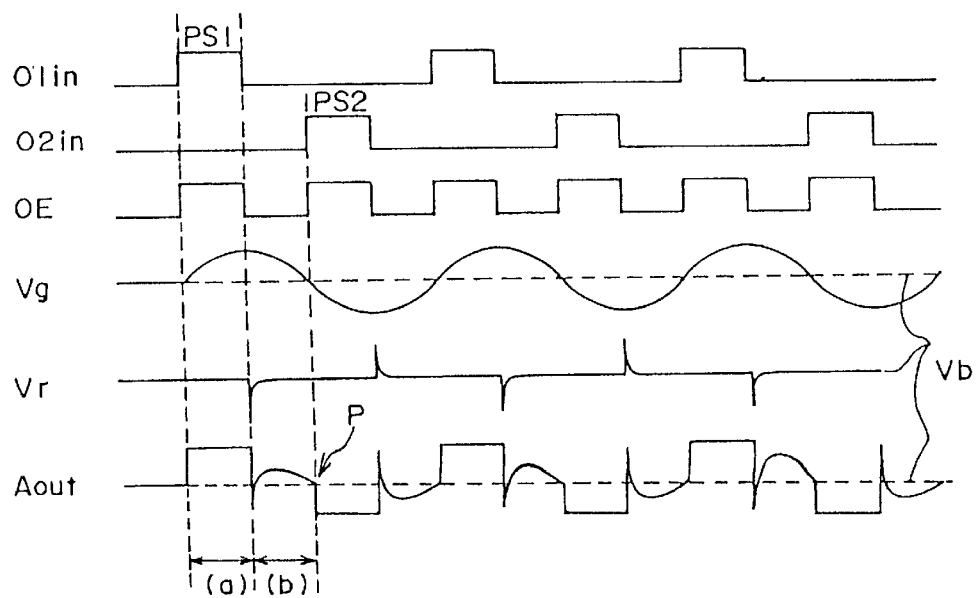
FIG. 2 is a chart of waveforms showing the operation of the driving circuit in FIG. 1.

FIG. 2 is a chart of waveforms showing the operation of the driving circuit in FIG. 1.

Referring to FIG. 1, reference numerals 1a and 1b denote motor drivers; 2, a driving coil; 3, a bias circuit comprising switch means 3a and 3b and bias resistors 3c and 3d having the same resistance value; 4, a flat stator; 5, a counterelectromotive voltage detection circuit comprising an inverter 5a, a feedback resistor 5b, and an input resistor 5c; 6, an inverter; and 7, a rotor.

When a signal OE is at "H" level, the motor drivers 1a and 1b respectively buffer and output input signals O1in and O2in; when the signal OE is at "L" level, outputs are set at a high impedance. The switch means 3a and 3b are turned off when a signal SE is at "L" level and are turned on when the signal SE is at "H" level. The operation of the circuit shown in FIG. 1 will be described below with reference to the chart of waveforms shown in FIG. 2.

In a period a of FIG. 2, since the signal OE is at "H" level, and the motor driver 1a outputs a pulse signal PS1 of "H" level, a current flows through the driving coil 2 to rotate the rotor 7 in the same manner as described in the prior art. Meanwhile, both the switch means 3a and 3b are in the OFF state because the signal SE is at "L" level. In a period b of FIG. 2, since the signal OE is at "L" level, outputs from the motor drivers 1a and 1b are set in a high-impedance state, and in turn the switch means 3a and 3b are turned on. For this reason, a terminal X as one terminal of the driving coil 2 is applied with a bias voltage Vb which is ½ the power supply voltage.

The waveform of a voltage which appears in the period b of FIG. 2 at a terminal Y as one terminal of the driving coil 2 will be explained. When the outputs from the motor drivers 1a and 1b are in a high-impedance state, the switch means 3a and 3b are in the ON state, and the voltage at the terminal X is set at the level of the bias voltage Vb by the bias resistors 3c and 3d, the terminal Y has the voltage value of the bias voltage Vb similar to the terminal X if the terminal Y is free from influences of rotation of the rotor 7 and the motor drivers 1a and 1b. However, immediately after the pulse signal PS1 is output, an induced voltage Vr is generated by stopping a current flowing through the driving coil 2, as shown in FIG. 2. In addition, when the pulse signal PS1 is output to rotate the rotor 7, a counterelectromotive voltage Vg is generated due to the rotation of the rotor 7, as shown in FIG. 2. The composite waveform of these generated voltages appears at the terminal Y, and this voltage waveform is amplified by the counterelectromotive voltage detection circuit 5, obtaining a waveform indicated by Aout in FIG. 2.

Immediately after the pulse signal PS1 is output, the induced voltage generated from the driving coil 2 is dominant in the waveform Aout in the period b of FIG. 2. The influence decreases with a lapse of time, and the counterelectromotive voltage generated from the rotor 7 then becomes dominant. Referring to FIG. 2, a timing P at which the waveform of Aout crosses the bias voltage Vb from a positive side in a negative direction almost coincides with a timing at which the rotor 7 passes the electromagnetically stable point described above. At this timing, if the motor driver 1b opposite to the motor driver which has previously output the pulse signal PS1 outputs a pulse signal PS2, the rotor 7 continuously rotates in the forward direction without rotation in the reverse direction. This is because the pole position of the rotor 7 with respect to the flat stator 4 has passed the electromagnetically stable point.

As described above, according to the driving scheme of the present invention, the pulse signal PS2 is output at a timing immediately after the pole position of the rotor rotated by outputting the pulse signal PS1 falls within a region where the rotor is certainly rotated in the forward direction by the pulse signal PS2 to be output next. Therefore, the output interval of a pulse signal can be minimized.

At the output timing of a pulse signal, the pole position of the rotor 7 falls within the region where the rotor 7 certainly rotates in the forward direction, and the rotor 7 itself keeps rotating in the forward direction. Therefore, stable rotation can be obtained.

Since the rotor 7 is rotated without stopping, a high rotational speed can be kept even with a narrow pulse signal, which allows the motor to rotate with a small energy, decreasing the current consumption per revolution of the motor compared to the conventional scheme.

More specifically, the counterelectromotive voltage detection circuit 5 of the present invention detects a counterelectromotive voltage generated from the rotor 7 by using the driving coil 2. In detecting the counter-electromotive voltage, the outputs from the motor drivers 1a and 1b are set to a high impedance, and the bias means for biasing one terminal of the driving coil 2 to the bias voltage Vb is used. Therefore, an AC counterelectromotive voltage generated upon rotation of the rotor 7 can be detected without being clamped by a power supply potential.

Figure 3:
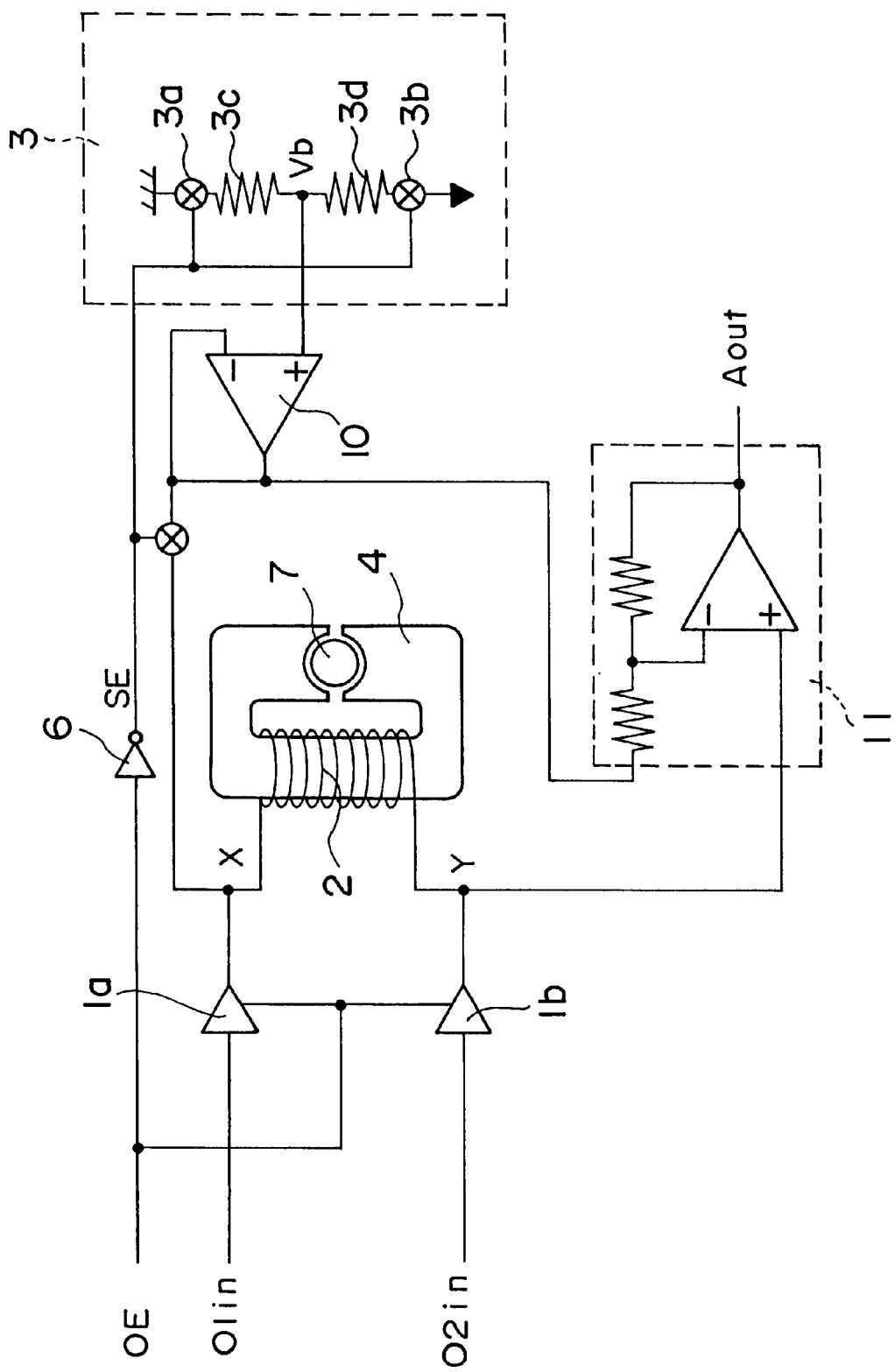
FIG. 3 is a circuit diagram showing a driving circuit in a motor driving apparatus according to another embodiment of the present invention.

In the driving circuit described above, the bias voltage Vb is formed by dividing the power supply voltage using the bias resistors 3c and 3d, as an example. Alternatively, as shown in FIG. 3, a buffer circuit 10 may be inserted between the terminal X and a contact point between the bias resistors 3c and 3d. In the arrangement of FIG. 3, since the level of the bias voltage Vb is hardly affected by a variation in load on the amplification circuit side, the counterelectromotive voltage can be detected more stably, compared to the arrangement of FIG. 1. The arrangement of the counterelectromotive voltage detection circuit 5 in FIG. 1 may be replaced with the arrangement of a counterelectromotive voltage detection circuit 11 using an operational amplifier, shown in FIG. 3. With this arrangement, the counterelectromotive voltage detection circuit free from influences of a variation in power supply voltage and the like can be realized.

The driving portion of the motor driving apparatus according to the present invention has been described above. Next, a circuit system for realizing the driving scheme of the present invention will be described with reference to the accompanying drawings.

Figure 4:
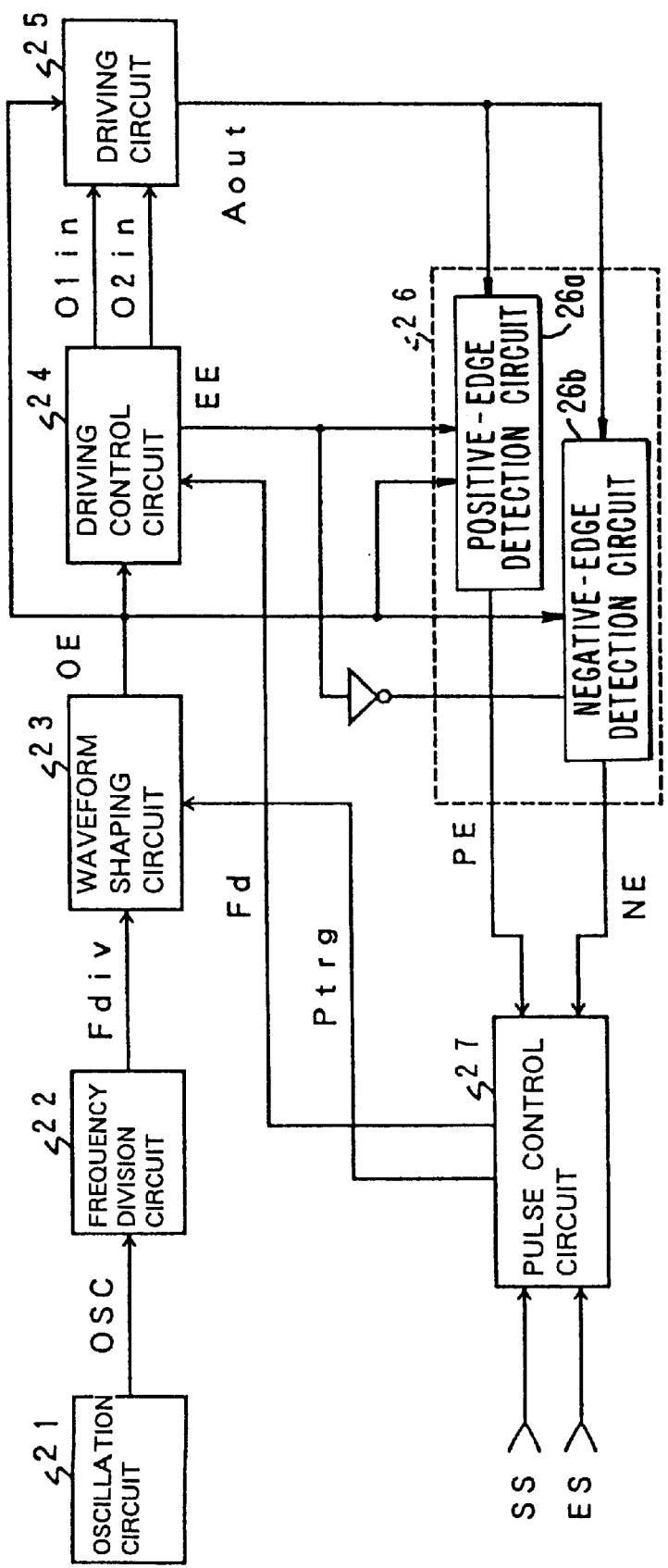
FIG. 4 is a block diagram showing the system of the motor driving apparatus according to the present invention.

FIG. 4 is a block diagram showing the system of the motor driving apparatus according to the present invention.

Reference numeral 21 denotes an oscillation circuit; 22, a frequency division circuit; 23, a waveform shaping circuit; 24, a driving control circuit; 25, a driving circuit; 26, a pole position detection circuit comprising a positive-edge detection circuit 26a and a negative-edge detection circuit 26b; and 27, a pulse control circuit.

Figure 5:
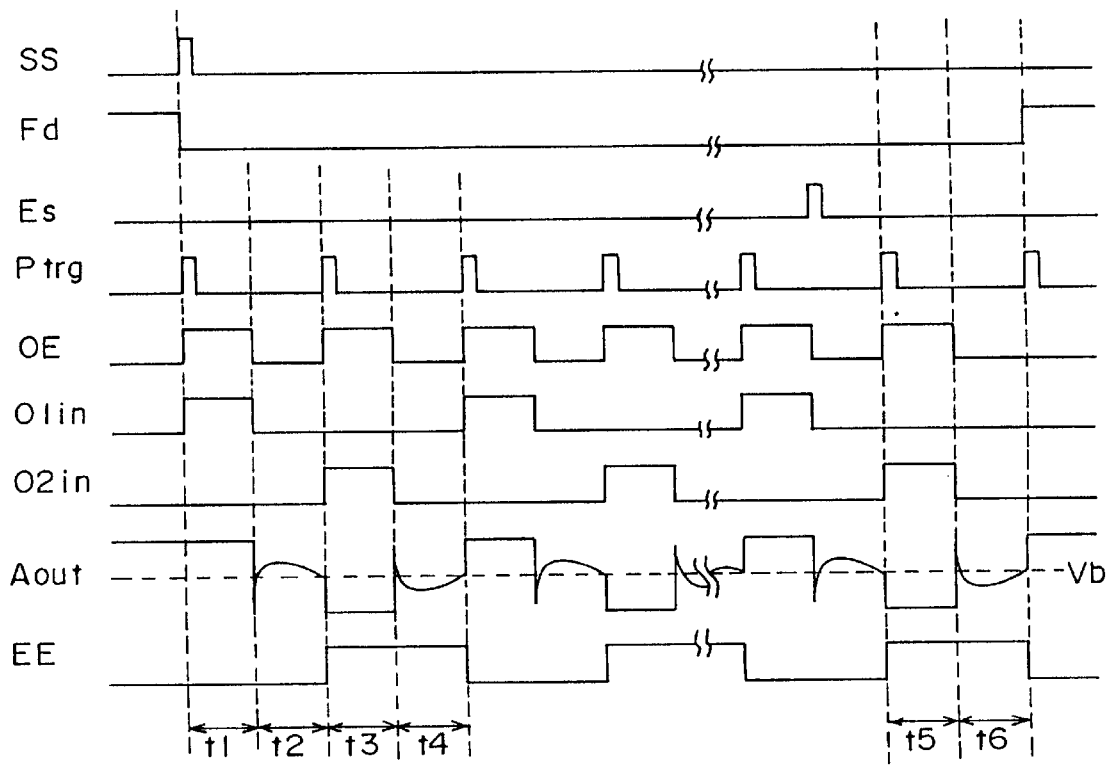
FIG. 5 is a chart of waveforms showing the operation state of the system in the block diagram of FIG. 4.
Figure 6:
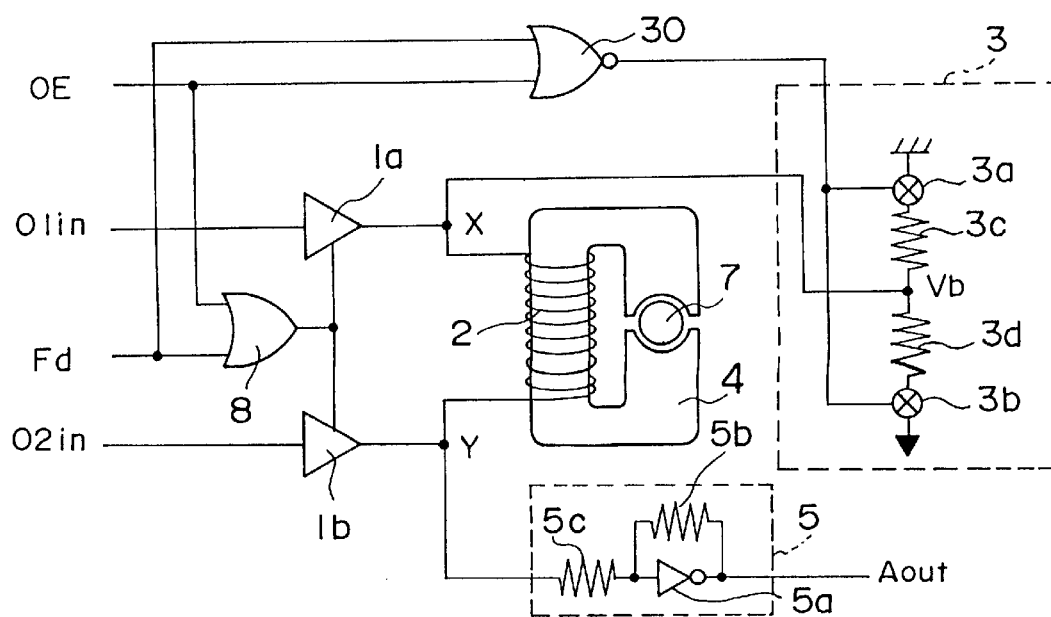
FIG. 6 is a circuit diagram showing a driving circuit in a motor driving apparatus according to still another embodiment of the present invention.

The driving circuit 25 is obtained by adding an OR circuit 8 and a NOR circuit 30 to the above-described driving circuit in FIG. 1, and has an arrangement shown in FIG. 6. FIG. 5 is a chart of waveforms showing the operative state of the system in the block diagram of FIG. 4.

When this circuit system of the motor driving apparatus is in an inoperative state, i.e. the rotor 7 does not rotate, a signal Fd output from the pulse control circuit 27 is at "H" level. In this state, since both the outputs O1in and O2in from the driving control circuit 24 to the driving circuit 25 are at "L" level, both the outputs from the motor drivers 1a and 1b are at "L" level, which prevents the motor from rotating due to an external magnetic field or shock. In addition, since the signal Fd is at "H" level, an output from the NOR circuit 30 is at "L", and both the switch means 3a and 3b are in the OFF state.

In rotating the rotor 7, when a starting signal SS is externally input to the pulse control circuit 27, the signal Fd output from the pulse control circuit 27 goes to "L" level, and a signal Ptrg is output. When the signal Fd is at "L" level, and the signal OE from the waveform shaping circuit 23 is at "H" level, the output signal O1in from the driving control circuit 24 is at "H" level for a signal EE of "L" level, and the signal O2in is at "H" level for the signal EE of "H" level.

As in a period t1 of FIG. 5, the waveform shaping circuit 23 sets the signal OE to "H" level in synchronism with the leading edge of the signal Ptrg. The driving control circuit 24 sets the signal O1in to "H" level while the signal OE is at "H" level. At this time, the signal EE as an output from the driving control circuit 24 is at "L" level. When the signal OE goes to "L" level upon a lapse of a predetermined time, the outputs from the motor drivers 1a and 1b are set in a high-impedance state, and then the switch means 3a and 3b are turned on to bias the terminal X of the driving coil 2 to the bias voltage Vb.

The operation of the positive-edge detection circuit 26a and the negative-edge detection circuit 26b will be described. When the signal EE is at "H" level, the positive-edge detection circuit 26a is in an active state. When the signal OE is at "L" level, and the signal Aout crosses the bias voltage Vb in the negative direction, a negative-edge detection signal NE is output.

In a period t2 of FIG. 5, the output signal Aout from the counterelectromotive voltage detection circuit 5 outputs the counterelectromotive voltage Vg generated upon rotation of the rotor 7, as shown in FIG. 5. Upon reception of the signal Aout, the negative-edge detection circuit 26b outputs the negative-edge detection signal NE when the level of the signal Aout crosses the bias voltage Vb in the negative direction. Upon reception of the negative-edge detection signal NE, the pulse control circuit 27 outputs the signal Ptrg.

The waveform shaping circuit 23 sets the signal OE to "H" level again in synchronism with the leading edge of the signal Ptrg during a period t3 of FIG. 5. The driving control circuit 24 sets the signal EE to "H" level in synchronism with the leading edge of the signal OE and sets the signal O2in to "H" level while the signal OE is at "H" level.

When the signal OE goes to "L" level upon a lapse of a predetermined time, the outputs from the motor drivers 1a and 1b are set in a high-impedance state, and the switch means 3a and 3b are turned on to bias the terminal X of the driving coil 2 to the bias voltage Vb.

In a period t4 of FIG. 5, upon reception of the signal Aout, the positive-edge detection circuit 26a outputs a positive-edge detection signal PE when the level of the signal Aout crosses the bias voltage Vb from the negative side in the positive direction. Upon reception of the positive-edge detection signal PE, the pulse control circuit 27 outputs the signal Ptrg. The same operation is repeated to allow the rotor 7 to continuously rotate.

When rotation of the rotor 7 is to be stopped, a stop signal ES is externally input to the pulse control circuit 27. When the pulse control circuit 27 receives the positive-edge detection signal PE or the negative-edge detection signal NE immediately upon reception of the stop signal ES, it outputs the last signal Ptrg. In the example shown in FIG. 5, the pulse control circuit 27 receives the negative-edge detection signal NE to output the signal Ptrg.

After the signal O2in at "H" level is output in a period t5 of FIG. 5, the positive-edge detection circuit 26a is set in the active state in a period t6 of FIG. 5 to output the positive-edge detection signal PE at a timing at which the signal Aout crosses the bias voltage Vb from the negative side in the positive direction. Upon reception of the positive-edge detection signal PE, the pulse control circuit 27 sets the signal Fd to "H" level, and the outputs from the motor drivers 1a and 1b are fixed to "L" level, completing the circuit operation.

Figure 7:
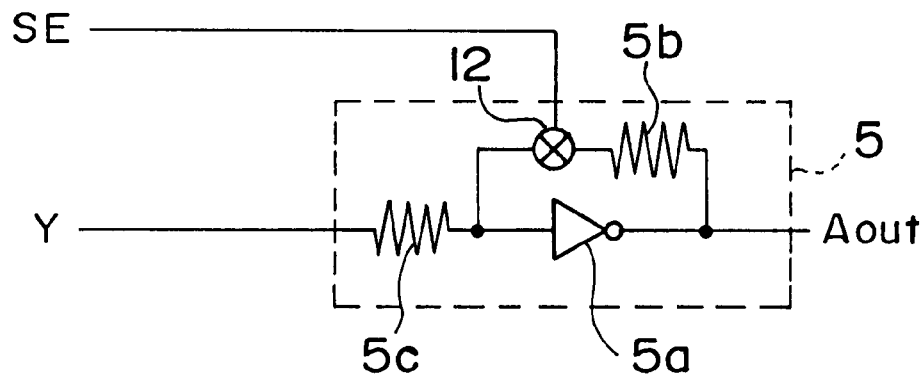
FIG. 7 is a circuit diagram showing a counterelectromotive voltage detection circuit according to still another embodiment o,f the present invention.
Figure 8:
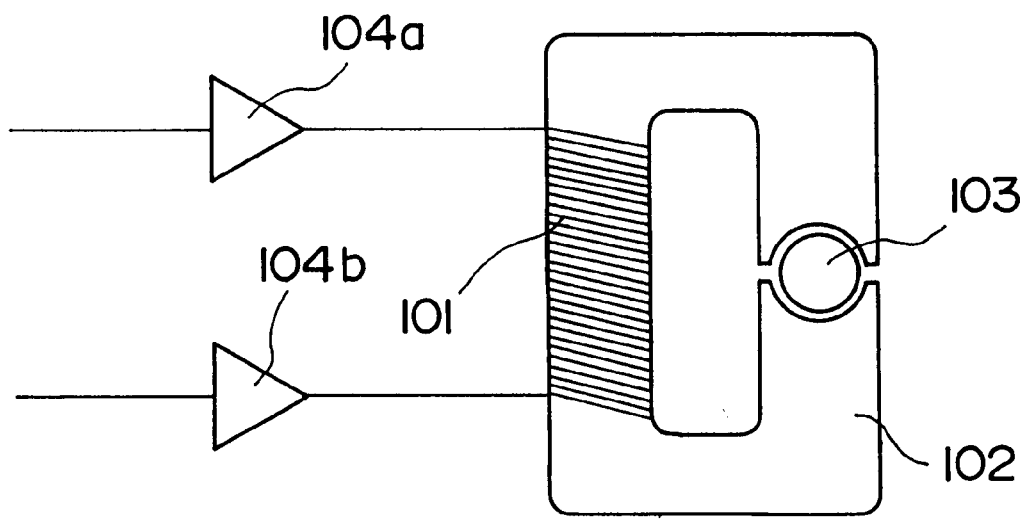
FIG. 8 is a circuit diagram showing the driving portion of a conventional motor driving apparatus.
Figure 9:
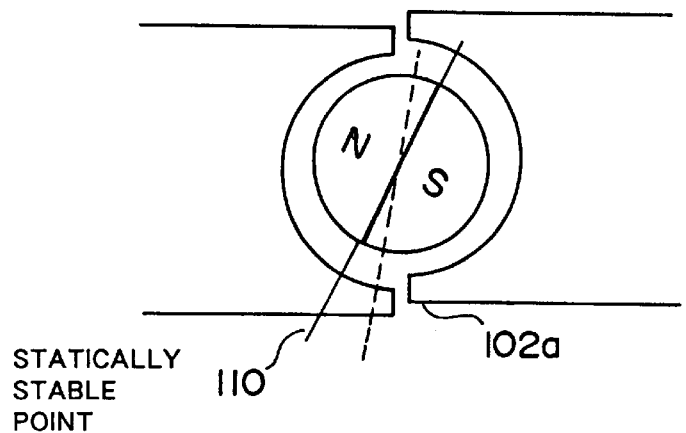
FIG. 9 is a plan view showing the statically stable point of a bipolar stepping motor in FIG. 8.
Figure 10:
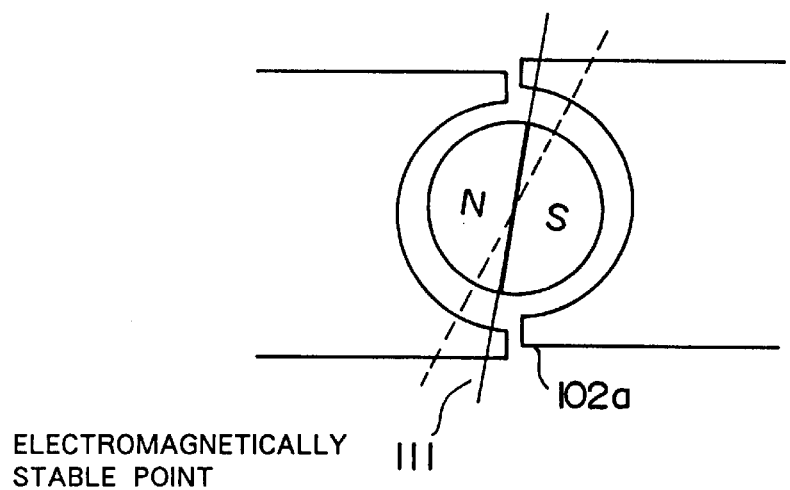
FIG. 10 is a plan view showing the electromagnetically stable point of the bipolar stepping motor in FIG. 8.
Figure 11:
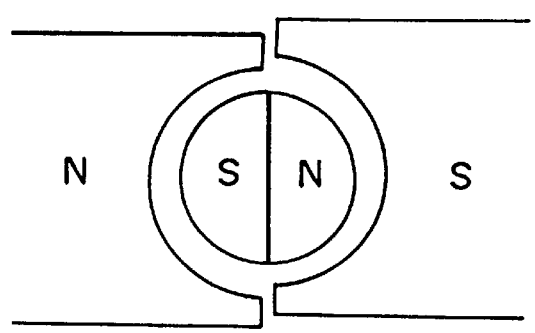
FIG. 11 is a plan view showing the pole position of the rotating bipolar stepping motor in FIG. 8.
Figure 12:
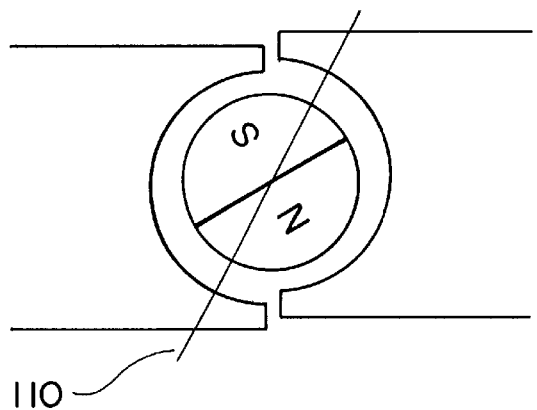
FIG. 12 is a plan view showing the rotational direction of the bipolar stepping motor in FIG. 8.
Figure 13:
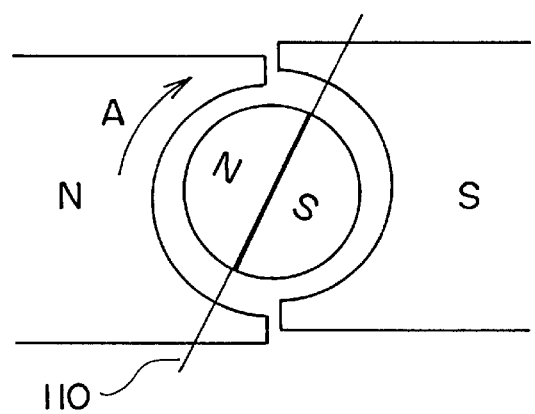
FIG. 13 is a plan view showing the rotational direction of the bipolar stepping motor in FIG. 8.
Figure 14:
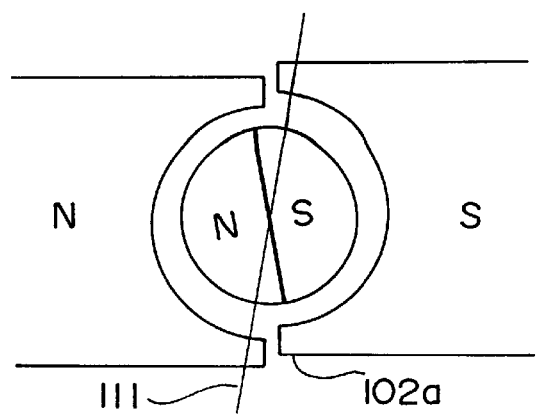
FIG. 14 is a plan view showing the rotational direction of the bipolar stepping motor in FIG. 8.
Figure 15:
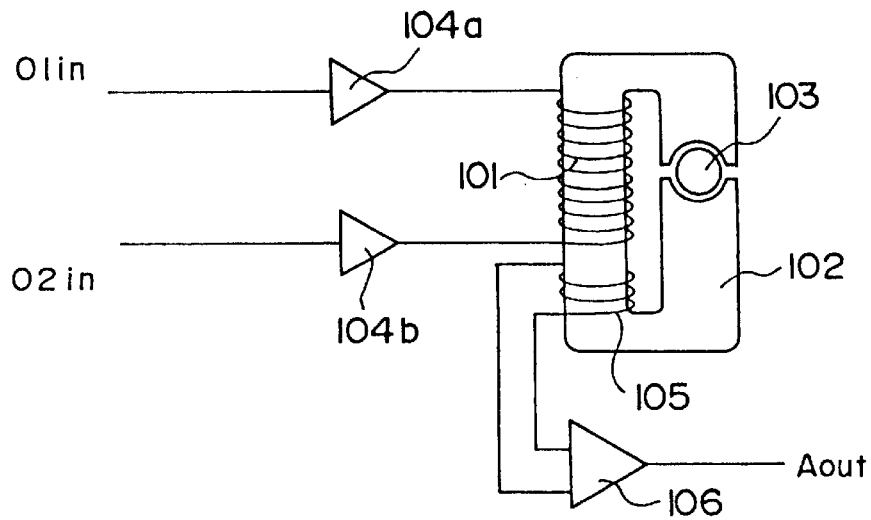
FIG. 15 is a circuit diagram showing the driving portion of a motor driving apparatus with a conventional detection coil.

In this embodiment, the bias means 3 and the counterelectromotive voltage detection circuit 5 need not operate when the rotor 7 does not rotate. In consideration of a reduction in current consumption of the system when the rotor 7 does not rotate, therefore, the operation of the bias circuit 3 is preferably stopped by turning off the switch means 3a and 3b, and the counterelectromotive voltage detection circuit 5 is preferably provided with a switch 12, as shown in FIG. 7, not to consume a current in the counterelectromotive voltage detection circuit 5 when the rotor 7 does not rotate.

As described above, according to the present invention, the motor can be driven to rotate at a high speed with a simple system arrangement without changing the structure of a conventional flat bipolar motor. That is, since the counterelectromotive voltage detection circuit and the bias means, which are the characteristic features of the present invention, can be constituted by a resistor and a semiconductor element, they can be easily formed into an IC. Downsizing of motor driving apparatuses and a reduction in current consumption can be effectively realized in portable electronic devices such as electronic timepieces.

In the above-described embodiment, since a counterelectromotive voltage generated from the rotor is detected by the driving coil, the detection circuit is greatly affected by external noise, and particularly a magnetic field. For example, when the motor is placed in a DC magnetic field, a DC current may be generated across the coil depending on the relationship between the direction of the line of magnetic force and the direction of the coil. In this case, the signal Aout changes due to the influence of the DC magnetic field, i.e. the point (to be referred to as a "zero-crossing position" hereinafter) changes at which the signal Aout crosses the bias voltage Vb from the positive or negative side in the negative or positive direction, failing to detect a timing at which the counterelectromotive voltage goes to 0 level.

Figure 23:
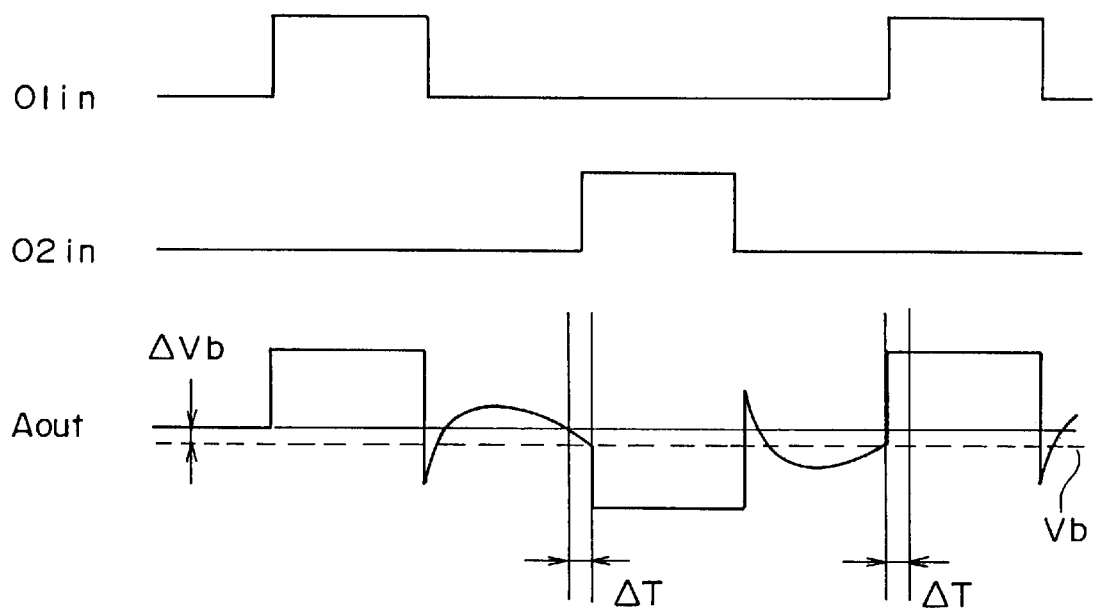
FIG. 23 is a chart for explaining a point at which a signal Aout crosses a bias voltage Vb from a positive or negative side in a negative or positive direction when a DC current is generated from a coil due to the influence of a DC magnetic field.

FIG. 23 is a chart for explaining the zero-crossing position when a DC current is generated from the coil due to the influence of the DC magnetic field.

When a DC voltage $\Delta Vb$ is generated from the coil due to the influence of the DC magnetic field, the entire waveform of the signal Aout shifts upward by $\Delta Vb$, compared to the case without any DC magnetic field. For this reason, at the zero-crossing timing in driving the rotor, detection from the positive side in the negative direction is delayed by $\Delta T$, while detection from the negative side in the positive direction advances by $\Delta T$. As a result, if the detection is delayed, the rotor is braked by the time $\Delta T$, decreasing the rotational speed of the motor. To the contrary, if the detection advances, the rotor is turned back, rotating the motor in the reverse direction.

An embodiment which can eliminate this influence of the DC magnetic field will be described below.

Figure 16:
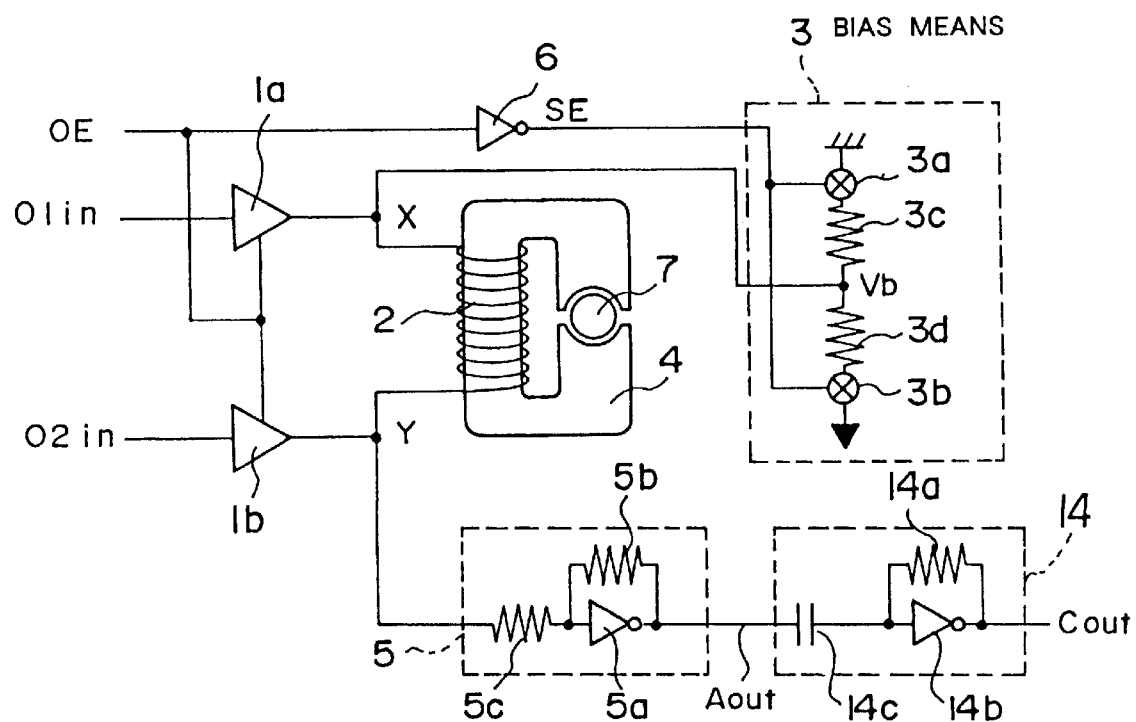
FIG. 16 is a circuit diagram showing a driving circuit in a motor driving apparatus according to the second embodiment of the present invention.

FIG. 16 is a circuit diagram showing a driving circuit in a motor driving apparatus according to the second embodiment of the present invention. The same reference numerals denote the same parts as in FIG. 1, and a detailed description thereof will be omitted.

In the embodiment, a DC voltage component generated by a DC magnetic field is cut by a capacitor to minimize the influence of the DC magnetic field.

As shown in FIG. 16, the driving circuit of this embodiment is realized by adding a DC voltage removing circuit 14 to the driving circuit in FIG. 1. The DC voltage removing circuit 14 is connected to the output of a counterelectromotive voltage detection circuit 5. The DC voltage removing circuit 14 comprises a feedback resistor 14a, an inverter 14b, and a capacitor 14c. With this arrangement, a DC voltage component generated in a coil 2 can be removed by the DC voltage removing circuit 14. An output signal Cout from the DC voltage removing circuit 14 has an AC waveform from which the DC component is removed, i.e. a detected waveform. Signals O1in and O2in are controlled on the basis of points at which the signal Cout crosses a bias voltage Vb from the positive and negative sides in the negative and positive directions, thereby rotating the motor without being affected by the DC magnetic field.

Figure 17:
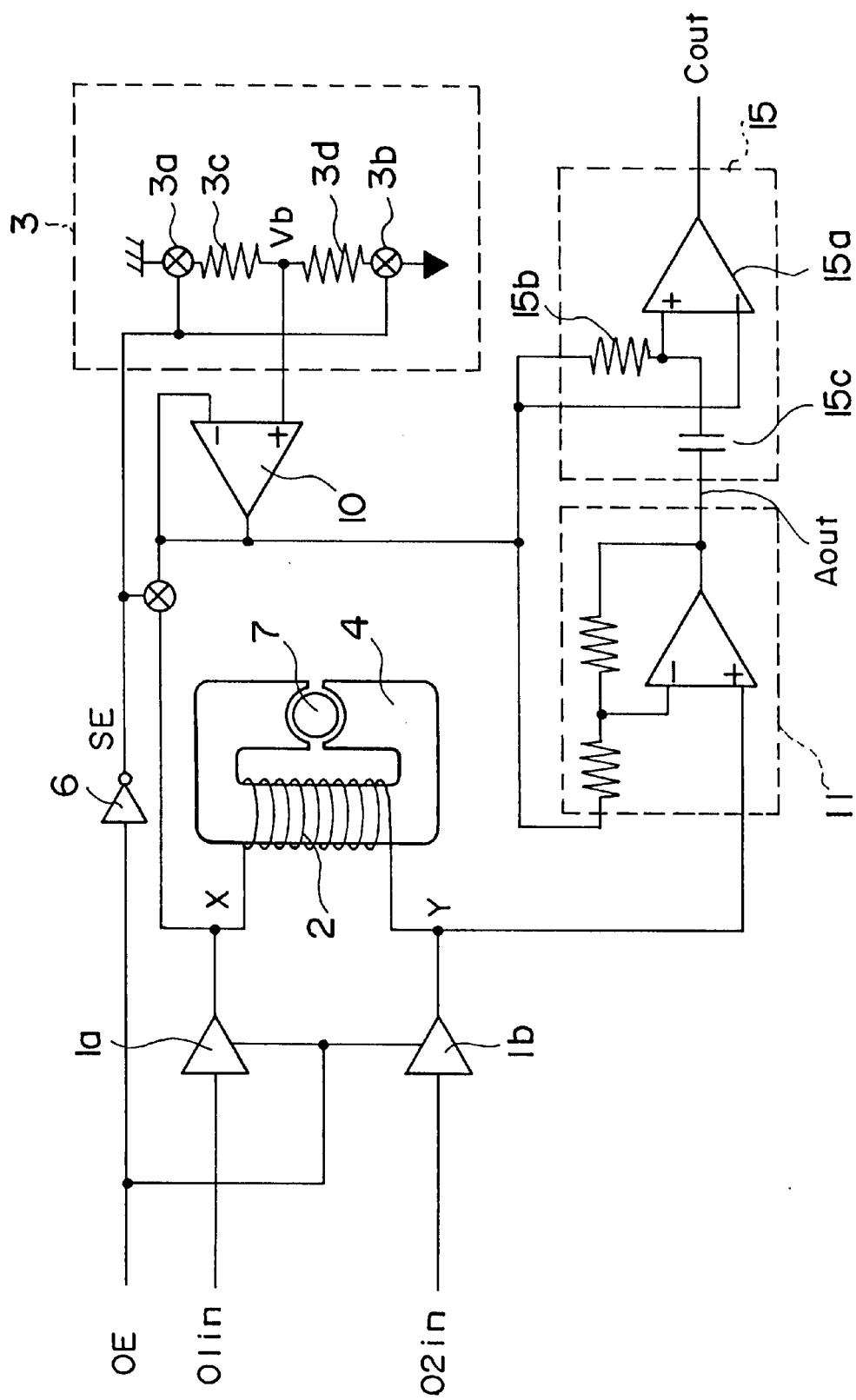
FIG. 17 is a circuit diagram showing a driving circuit in a motor driving apparatus according to still another embodiment of the present invention.

Removal of the DC voltage component by the capacitor can also be applied to the driving circuit shown in FIG. 3. In this case, a driving circuit is constituted as shown in FIG. 17. As shown in FIG. 17, this driving circuit is realized by adding a DC voltage removing circuit 15 to the driving circuit in FIG. 3. The DC voltage removing circuit 15 comprises an operational amplifier 15a, an input resistor 15b, and a capacitor 15c.

Figure 18:
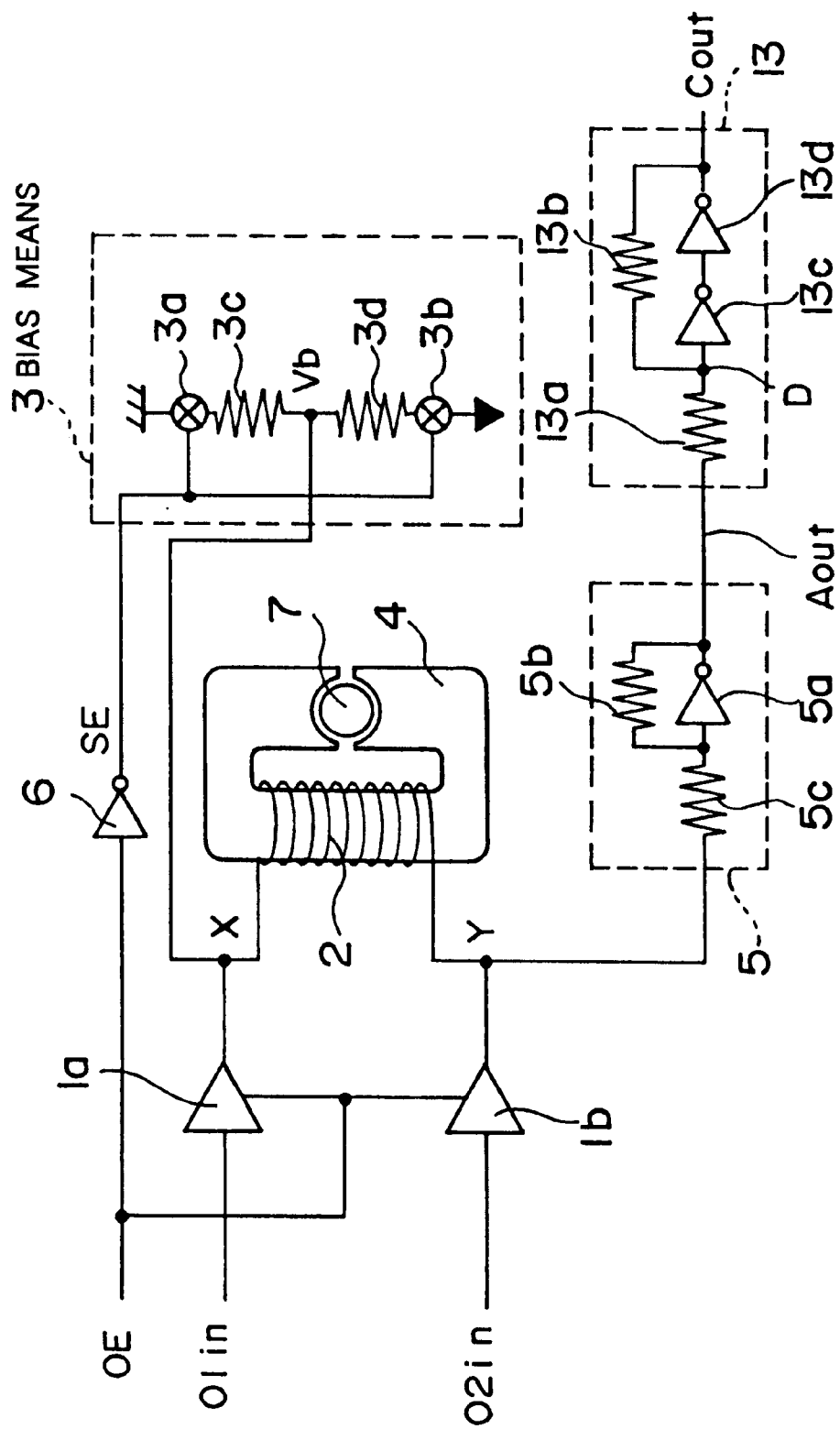
FIG. 18 is a circuit diagram showing a driving circuit in a motor driving apparatus according to the third embodiment of the present invention.

FIG. 18 is a circuit diagram showing a driving circuit in a motor driving apparatus according to the third embodiment of the present invention. The same reference numerals denote the same parts as in FIG. 1, and a detailed description thereof will be omitted.

This embodiment aims to reduce the influence of a DC voltage component generated by the DC magnetic field by providing a hysteresis comparator.

Figure 19:
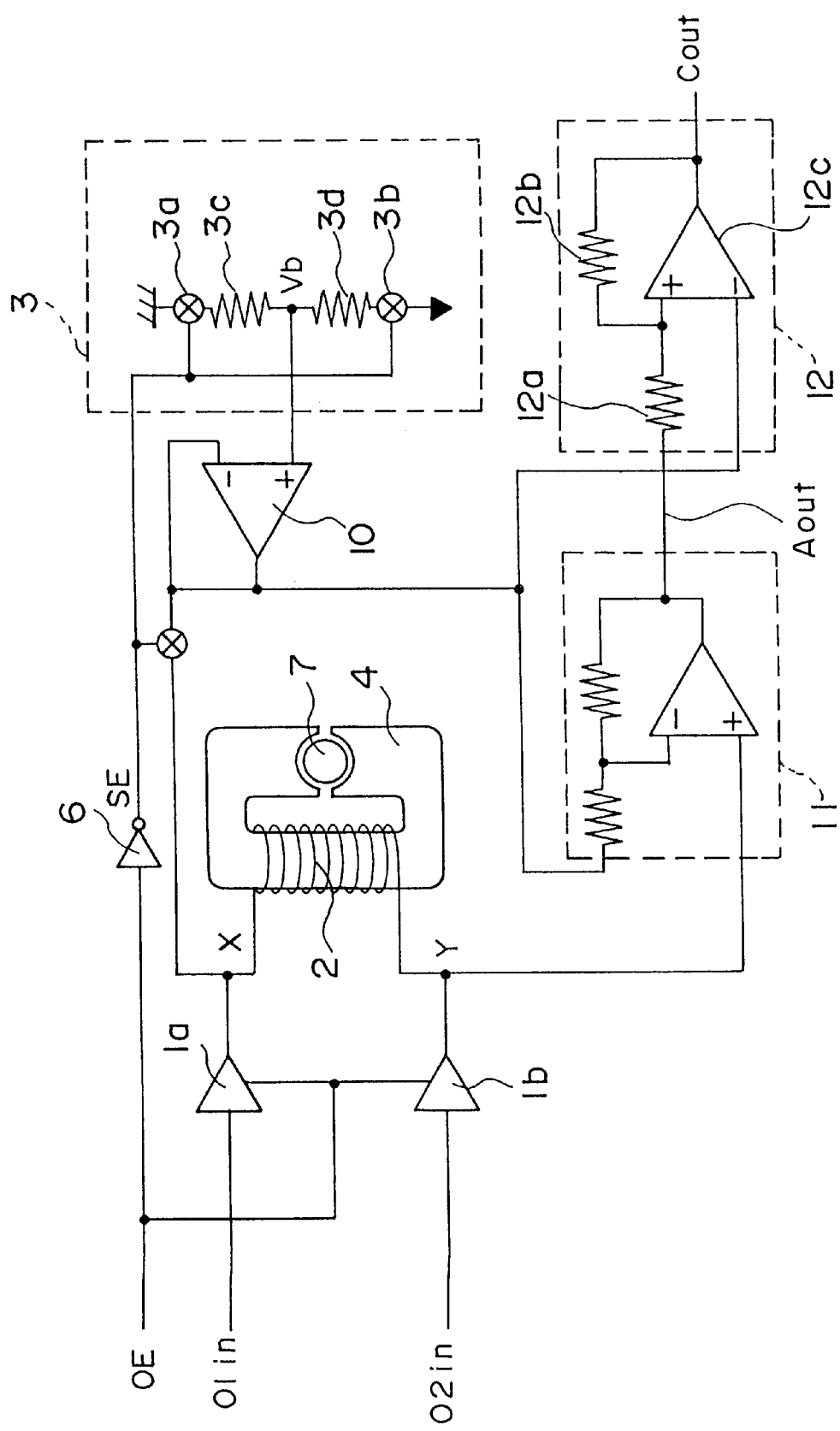
FIG. 19 is a circuit diagram showing a driving circuit in a motor driving apparatus according to still another embodiment of the present invention.

As shown in FIG. 18, the driving circuit of this embodiment is realized by adding a hysteresis comparator 13 to the driving circuit in FIG. 1. The hysteresis comparator 13 is connected to the output of a counterelectromotive voltage detection circuit 5. The hysteresis comparator 13 comprises an input resistor 13a, a feedback resistor 13b, and inverters 13c and 13d. When an amplifier is used as shown in FIG. 3, this driving circuit can be realized by providing a hysteresis comparator 12 comprising an input resistor 12a, a feedback resistor 12b, and an amplifier 12c, as shown in FIG. 19.

Figure 20:
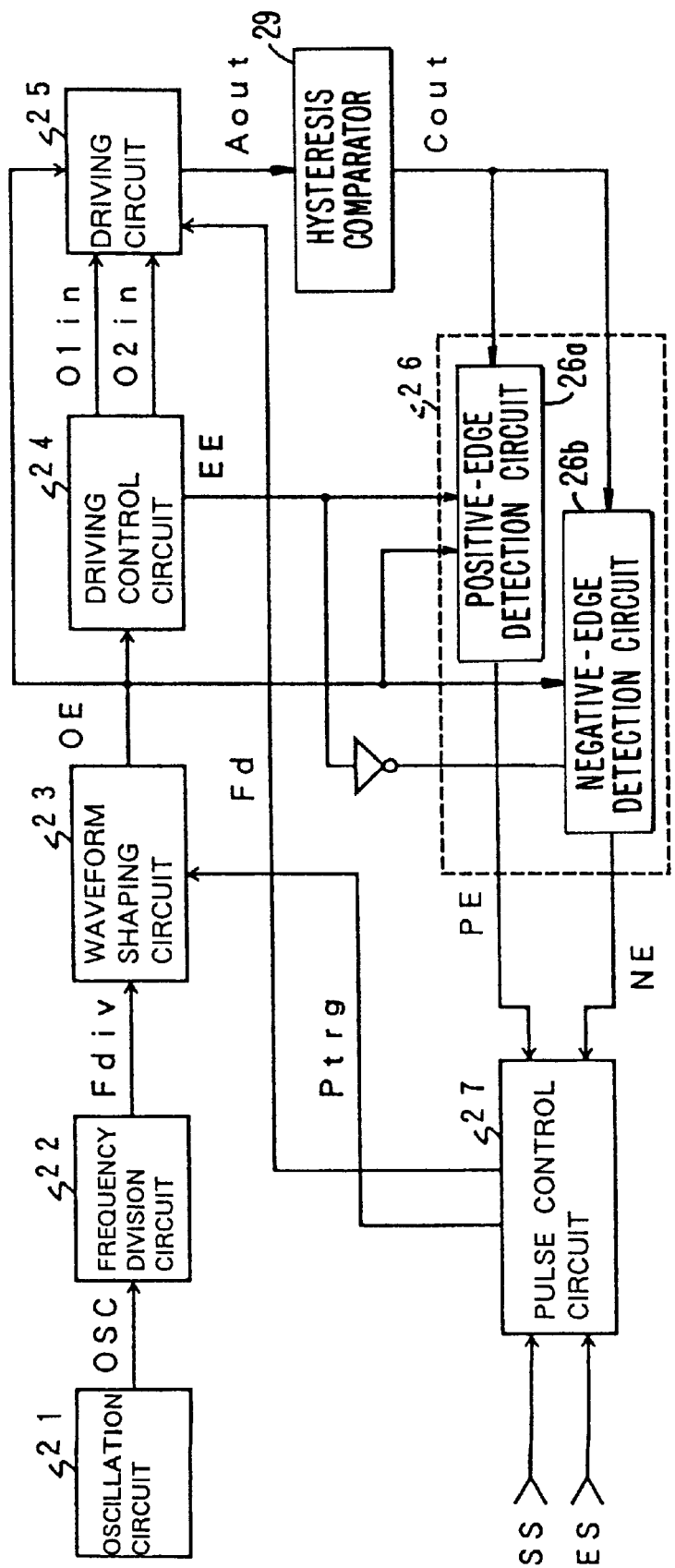
FIG. 20 is a block diagram showing the system of a motor driving apparatus according to still another embodiment of the present invention.

In this embodiment, as shown in FIG. 20, a hysteresis comparator 29 (corresponding to the hysteresis comparator 13 in FIG. 18 or the hysteresis comparator 12 in FIG. 19) is arranged between a driving circuit 25 and a pole position detection circuit 26. With this arrangement, the zero-crossing detection timing is delayed to prevent a malfunction caused by the influences of a magnetic field and the like.

The operation of the hysteresis comparator will be described below by exemplifying the driving circuit shown in FIG. 18. In the operation of each of the inverters 13c and 13d, if an input is at "H" level with reference to a voltage Vth which is ½ the power supply voltage, an output is set to "L" level; if an input is at "L" level, an output is set to "H" level. If a signal Aout is at "L" level, an output from the hysteresis comparator 13, i.e. an output from the inverter 13d, is set to "L" level; if the signal Aout is at "H" level, the output is set to "H" level. Note that when the potential of the signal Aout becomes the voltage Vth during the shift from the "L" level to "H" level, the potential of the signal Aout and the output potential (i.e. "L" level) of the inverter 13d are divided by the input resistors 13a and 13b, the potential at a point D becomes lower by the voltage Vth, and the output signal Cout does not change.

Assume that the resistance value of the resistor 13a is Ra, the resistance value of the resistor 13b is Rb, and the power supply voltage value is Vdd. To switch the output of the inverter 13d from "L" level to "H" level requires a potential Vc1 of the signal Aout, which is given by equation (1)

$$Vc1 = Vth + \frac{1}{2}(Ra/Rb) \times Vdd \qquad (1)$$

On the other hand, when the signal Aout changes from "H" level to "L" level, switching the output of the inverter 13d from "H" level to "L" level requires a potential Vc2 of the signal Aout given by equation (2):

$$Vc2 = Vth - \frac{1}{2}(Ra/Rb) \times Vdd \qquad (2)$$

Figure 21:
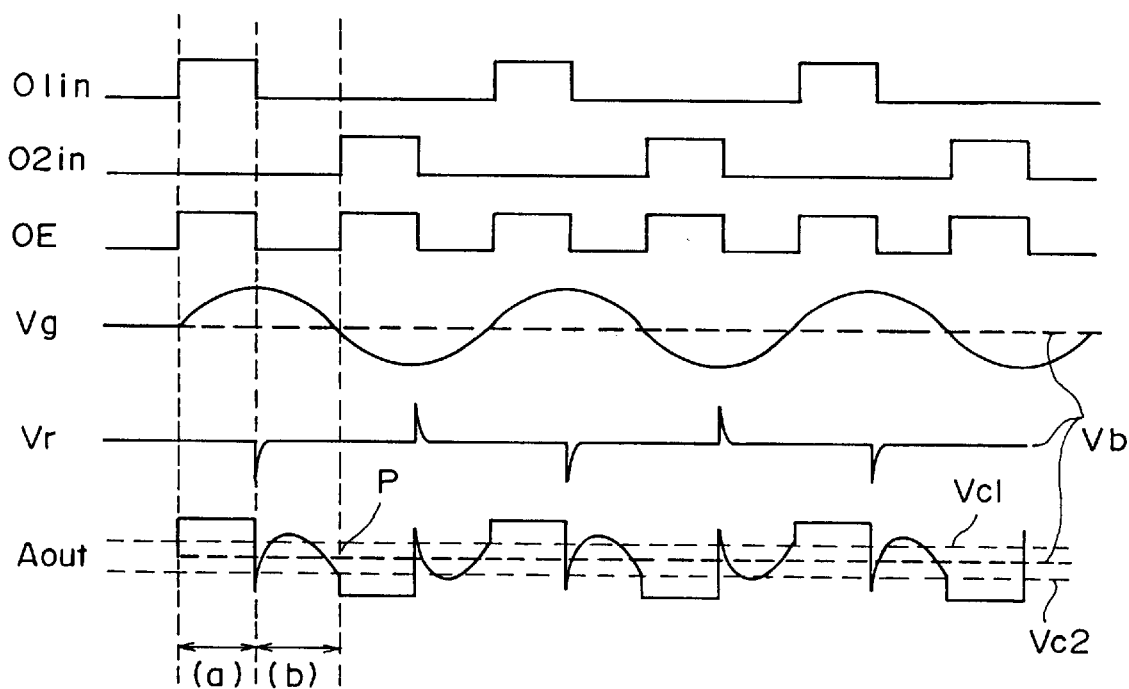
FIG. 21 is a chart of waveforms showing the operation of the driving circuit in FIG. 18.

As a result, the zero-crossing potentials in the shift from the positive side in the negative side is different from that in the shift from the negative side in the positive side, as shown in FIG. 21, so that the detection timing can be delayed.

According to this embodiment, the rotational stability of the motor can be effectively improved when the motor is not only affected by the DC magnetic field but also applied with shocks and the like.

Figure 22:
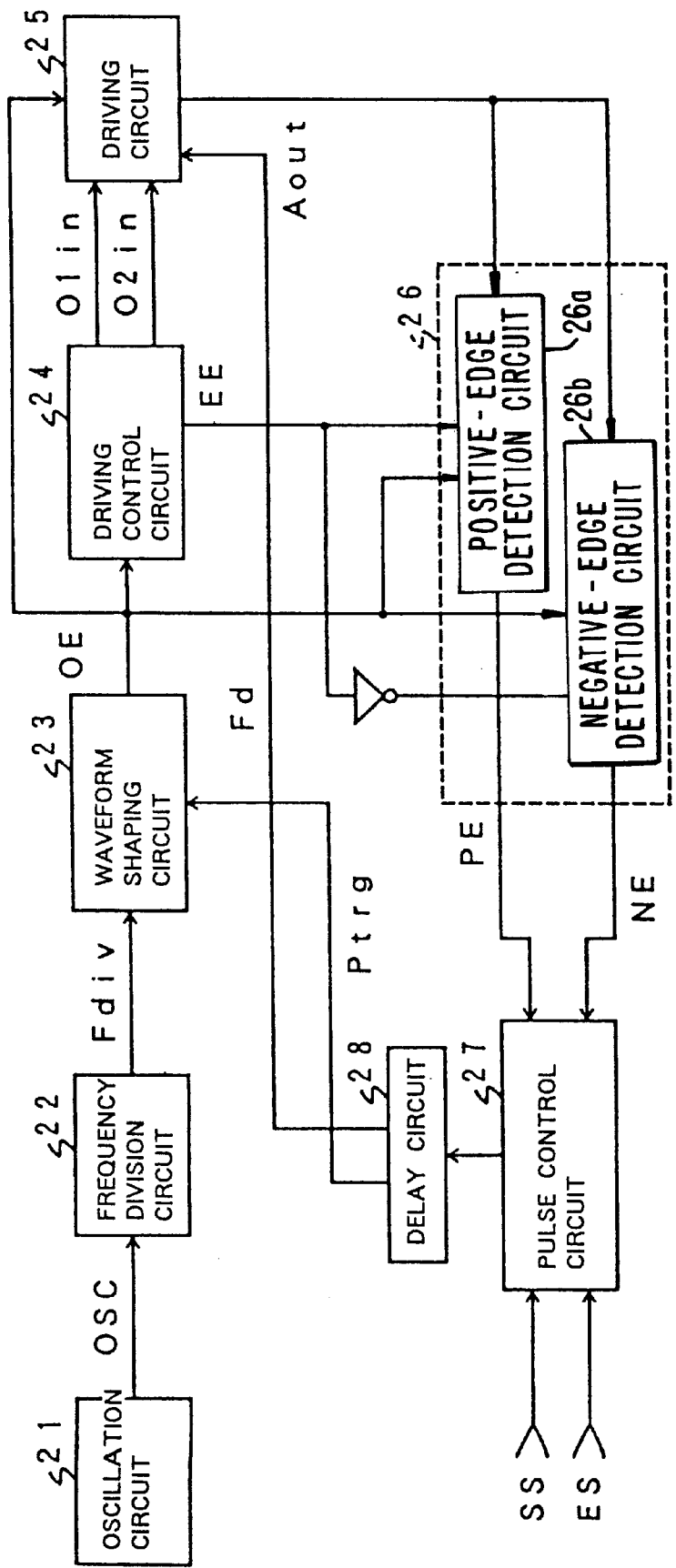
FIG. 22 is a block diagram showing the system of a motor driving apparatus according to still another embodiment of the present invention.

FIG. 22 is a block diagram showing the system of a motor driving apparatus according to another embodiment of the present invention. The same reference numerals in FIG. 22 denote the same parts as. in FIG. 4, and a detailed description thereof will be omitted.

This embodiment aims to reduce the influence of a DC voltage component by providing a predetermined delay time until pulse signals O1in and O2in are output upon detection of a zero-crossing position. For example, if a voltage generated due to the influence of a magnetic field is within ΔVd, a next pulse signal is not output too early with a delay ΔT shown in FIG. 23, thereby preventing the worst malfunction of rotating the motor in the reverse direction.

As shown in FIG. 22, the motor driving apparatus of this embodiment is realized by adding a delay circuit 28 to the motor driving apparatus in FIG. 4. In FIG. 22, the delay circuit 28 is arranged between a pulse control circuit 27 and a waveform shaping circuit 23. According to the gist of this embodiment, the delay circuit 28 may be arranged between the waveform shaping circuit 23 and a driving control circuit 24 because the delay can be performed until a pulse signal is output upon detection of a zero-crossing position. In this case, the same effect can be obtained apparently.

Also in this embodiment, the rotational stability of the motor can be effectively improved when the motor is not only affected by the DC magnetic field but also applied with shocks and the like.

The present invention can be utilized in not only electronic timepieces but also every electronic device using a motor. In particular, its utility value is high in electronic devices requiring downsizing, and the present invention has effects on downsizing of motor driving apparatuses, a decrease in current consumption, and the like.

What is claimed is:

1. A motor driving apparatus having: a stepping motor constituted by a stator having at least two poles, a rotor with a permanent magnet having at least two poles, and a driving coil magnetically coupled to said stator; driving pulse generation means for outputting a pulse signal to drive said stepping motor; a driving circuit for supplying a driving current to said driving coil on the basis of the signal from said driving pulse generation means; a counterelectromotive voltage detection circuit for detecting a counterelectromotive voltage generated upon rotation of said rotor; bias means for biasing a potential level to a potential within the range of power supply voltage, the bias means including voltage divider means; and pole position detection means for detecting a pole position of said rotating rotor with respect to said stator on the basis of the counterelectromotive voltage generated in said counterelectromotive voltage detection circuit, said driving pulse generation means controlling an output timing of the pulse signal on the basis of a detection signal from said pole position detection means, wherein said counterelectromotive voltage detection means is connected to one terminal of said driving coil, and said bias means for biasing a potential level to a potential within the range of power supply voltage is connected to a second terminal of said driving coil.

2. A motor driving apparatus according to claim 1, wherein said bias means outputs a bias voltage which is about ½ the power supply voltage.

3. A motor driving apparatus according to claim 1 further comprising switching means for controlling an operation of said bias means, said switching means being controlled to be in an OFF state during supply of the pulse signal from said driving circuit.

4. A motor driving apparatus according to claim 1 further comprising delay means for delaying the pulse signal to drive said stepping motor on the basis of the detection signal from said pole position detection means.

5. A motor driving apparatus according to claim 4, wherein said delay means is a hysteresis comparator connected to an output side of said counterelectromotive voltage detection circuit.

6. A motor driving apparatus according to claim 1, wherein said counterelectromotive voltage detection circuit has DC voltage component removing means for removing a DC voltage component of the counterelectromotive voltage generated upon rotation of said rotor.

7. A motor driving apparatus according to claim 1 wherein the bias means further include switch means.

* * * * *

UNITED STATES PATENT AND TRADEMARK OFFICE
CERTIFICATE OF CORRECTION

PATENT NO.    : 6,091,221
DATED         : July 18, 2000
INVENTOR(S)   : Haruhiko Higuchi It is certified that error appears in the above-identified patent and that said Letters Patent is hereby corrected as shown below:

On the title page item [54] "(Title of Invention)", change "PERFOMING" to -- PERFORMING --

Signed and Sealed this

Seventeenth Day of April, 2001

Attest:

NICHOLAS P. GODICI

*Attesting Officer*    *Acting Director of the United States Patent and Trademark Office*